United States Patent [19]

Zefira

[11] Patent Number: 5,739,478
[45] Date of Patent: Apr. 14, 1998

[54] WEIGHING SCALE

[76] Inventor: Uri Zefira, P.O. Box 241, 15241 Kfar Tavor, Israel

[21] Appl. No.: 591,470

[22] PCT Filed: Jul. 8, 1994

[86] PCT No.: PCT/US94/07924

§ 371 Date: Jan. 11, 1996

§ 102(e) Date: Jan. 11, 1996

[87] PCT Pub. No.: WO95/02168

PCT Pub. Date: Jan. 19, 1995

[30] Foreign Application Priority Data

Jul. 9, 1993 [IL] Israel ......................... 106303

[51] Int. Cl.$^6$ ................................................ G01G 19/08
[52] U.S. Cl. .............................. 177/130; 177/140; 177/145
[58] Field of Search ................................. 177/136, 137, 177/138, 139, 140, 141, 142, 143, 144, 145, 146, 130, 131

[56] References Cited

U.S. PATENT DOCUMENTS

| | | | |
|---|---|---|---|
| 1,165,714 | 12/1915 | Ruckes | 177/130 |
| 2,754,108 | 7/1956 | Brown | 177/136 |
| 2,940,746 | 1/1960 | Anderson et al. | 177/136 |
| 3,063,576 | 11/1962 | Hofmeister | 177/136 |
| 3,797,594 | 3/1974 | Chaffee | 177/136 |
| 4,137,977 | 2/1979 | Alger | 177/146 |
| 4,638,876 | 1/1987 | Balduin et al. | 177/139 |
| 4,666,004 | 5/1987 | Raz | 177/139 |
| 4,706,768 | 11/1987 | Kozozian et al. | 177/138 |
| 4,899,840 | 2/1990 | Boubille | 177/139 |

FOREIGN PATENT DOCUMENTS

| | | |
|---|---|---|
| 0 244 745 A2 | of 1987 | European Pat. Off. |
| 2 521 929 | of 1982 | France |
| WO 8602158 | of 1985 | WIPO |
| WO 9108977 | of 1990 | WIPO |

*Primary Examiner*—Michael L. Gellner
*Assistant Examiner*—Randy W. Gibson
*Attorney, Agent, or Firm*—Mark M. Friedman

[57] ABSTRACT

A scale for weighing a load, which is made up of a base (12), a weighing platform (34) for supporting the load and a load cell (36, 98) located below the weighing platform so as to alternate between an operational position, in which the weighing platform is supported by the load cell for measuring the weight of the load, and a neutral position, in which the weighing platform is supported by the base member for carrying the load. The scale further includes a contact member (40, 48, 116) located below the weighing platform (34) so as to reversibly come into contact with the load cell so that the load cell alternates between the operational position and the neutral position due to a relative movement between the load cell and the contact member. The scale further includes a mechanism (26, 52, 96, 110) for generating the relative movement.

24 Claims, 7 Drawing Sheets

WEIGHING SCALE

FIELD AND BACKGROUND OF THE INVENTION

The present invention relates to a weighing scale in which the weighing mechanism, and specifically the load cell, is protected from damage during use. The invention is particularly useful with pallet and other heavy-load carriers having built-in weighing systems.

Weighing scales measure the weight of a load placed on them using one or more load cells which support the load. Load cells are delicate devices which can be easily damaged if subjected to mechanical shock or impact. This problem is especially acute when the weighing scale is integrated into a forklift or pallet carrier for weighing the loads carried by these vehicles. These vehicles are frequently operated under harsh conditions and subjected to violent mechanical shocks which can damage the sensitive load cell.

Various mechanisms have been developed for protecting the load cell from damaging impacts. These include: 1) mounting the load cell on a ball bearing for absorbing horizontal shocks; and 2) inserting shock absorbers between the load cell and the weighing platform to protect it from vertical shocks. These solutions, however, have been found to be inadequate in efficiently protecting the load cell under the working conditions usually encountered by vehicles such as pallet carriers.

OBJECT AND BRIEF SUMMARY OF THE INVENTION

It is an object of the present invention to provide a weighing device which can be used under harsh working conditions without danger that its load cell will be damaged.

It is a further object of the invention to provide a weighing device which can alternate between a weighing mode and a neutral (working) mode.

It is a still further object of the invention to provide a weighing device which can be incorporated into a pallet carrier.

It is another object of the invention to provide a pallet carrier incorporating the weighing scale of the invention.

In accordance with this invention there is thus provided a scale for weighing a load comprising: a base member; a weighing platform for supporting the load; a load cell located below the weighing platform so as to alternate between an operational position, in which the weighing platform is supported by the load cell for measuring the weight of the load, and a neutral position, in which the weighing platform is supported by the base member for carrying the load; a contact member located below the weighing platform so as to reversibly come into contact with the load cell, wherein the load cell alternates between the operational position and the neutral position due to a relative movement between the load cell and the contact member; and a generating means for generating the movement.

In accordance with this invention there is also provided a pallet carrier incorporating the weighing scale of the invention.

By using the scale of the invention, the pallet carrier can be operated under normal working conditions, since the load cells are disengaged from contact with the weighing platform which supports the load. The load cells are brought into contact with the platform and load only when it is desired to weigh the load. In this way, the load cells are placed in a sensitive position for only the minimal period of time necessary to weigh the load.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
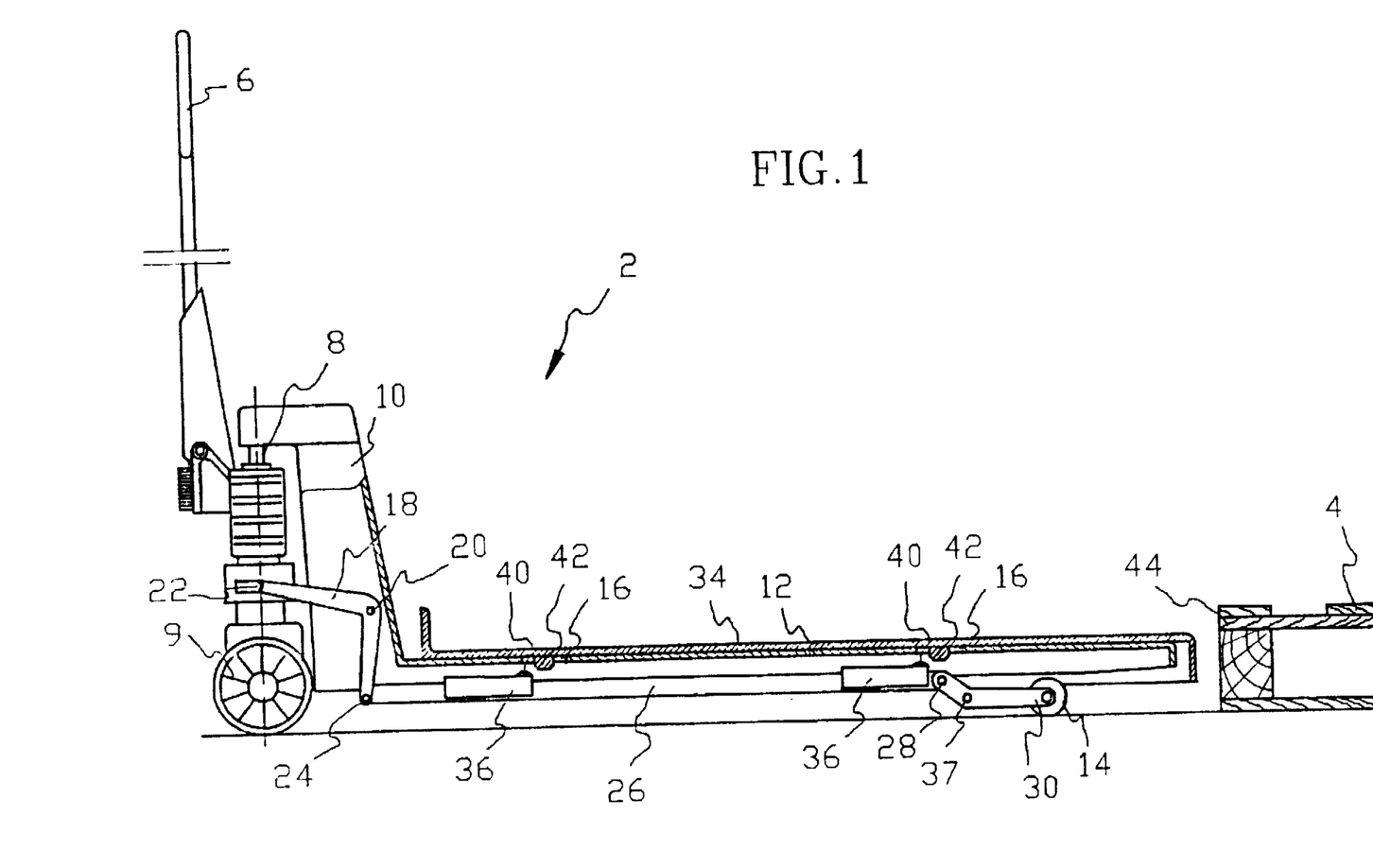
FIGS. 1, 2 and 3 are side sectional views of a pallet carrier incorporating a scale of the invention according to a preferred embodiment, the carrier being in its rest, weighing, and transport positions, respectively.

Referring now to FIG. 1, there is illustrated a pallet carrier 2 positioned before a pallet 4. The term 'pallet carrier' in this specification refers to all types of vehicles, whether motor or manually driven, for carrying loads, generally on pallets. The loads will usually be relatively heavy, thus necessitating a vehicle to lift them. The platform of the carrier which lifts the pallet is generally in the shape of a single plate or of twin prongs, as in a fork lift vehicle.

The pallet carrier 2 includes a lifting handle 6 at its rear end for raising an hydraulic piston 8 which is positioned immediately in front of the handle and above the rear steering wheels 9 of the carrier. The top of the piston supports the top of a triangularly-shaped frame 10 located in front of the piston. The frame 10 is fixed to a base member 12, which extends towards the front of the carrier and is the part of the carrier which lifts the load. The rear end of the base member is coupled to the piston through the frame 10, while the front end of the base member is supported on load-bearing rollers 14. Its upper surface is interrupted by openings 16 whose purpose will be explained below.

Two L-shaped levers 18 are fixedly attached by centrally-located axle 20 to the lower portion of the frame 10, with one end 22 of each lever pivotably mounted above the rear wheels 9 and its opposite end 24 pivotably coupled to the rear end of a linking bar 26. The front end 28 of the bar 26 is pivotably attached through an angled lever 30 to the load-bearing rollers 14. The lever 30 is fixedly attached to the front portion of the base member 12 by axle 32 positioned at the inflection point of the lever. The purpose of the linking bar 26 is to transfer the lifting power of the piston 8 to the front of the base member 12 so that the base member rises in parallel. A weighing platform 34 rests on the upper surface of the base member 12 but is not fixed to it. The weighing platform may be in the form of a single-plate, or in the form of two prongs such as in a fork-lift vehicle.

Axially mounted on the bar 26 and projecting through the openings 16 in the base member from below are two load cells 36, each having a load-bearing section 38 at one end. A friction-reducing protuberance 40 projects above the load-bearing section 38. Projecting down into the openings 16 from the lower surface of the weighing platform 34 are contact members 42 in the shape of inverted truncated triangles with curved corners. As illustrated in FIG. 1, the contact members are slightly anterior to the load-bearing sections 38, so that there is no contact between them.

The operation of the scale will now be described with reference to FIGS. 1, 2 and 3. In FIG. 1, the pallet carrier 2 is in its rest state. The base member 12 is at its lowest position so that it can be inserted under the upper surface 44 of the pallet 4. As described above, the weighing platform 34 is supported by the base member 12 and there is no contact between the weighing platform and the load cells 36, so that the scale is in a non-weighing or neutral position. In this postion, the load cells are protected from any shocks imparted to the weighing platform or base member.

Figure 2:
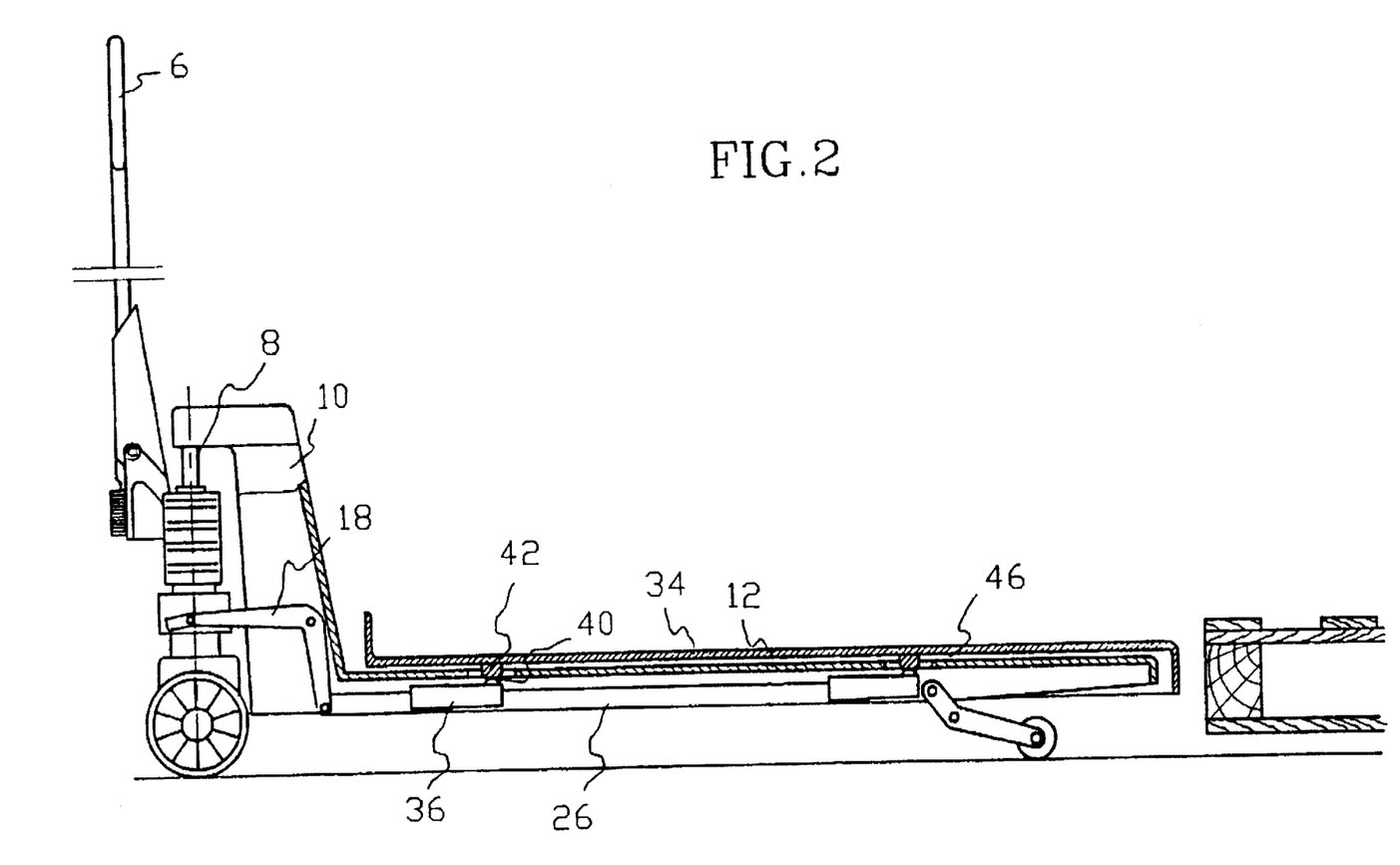

In FIG. 2, the piston 8 has been partially raised by action of the handle 6, lifting the frame 10, the base member 12, and the weighing platform 34. The lifting of the frame causes the lever 18 to pivot around the end 22, and the rotation of the lever 18 both lifts and pushes the bar 26 and the load cell 36 mounted on it forward so that the protuberances 40 of the load cells move into contact with the contact points 42. This further lifts the weighing platform so that an interval 46 is introduced between the weighing platform and the base member, and the platform is now supported by the load cells alone. The scale is now in a weighing or operational position so that the pallet, together with any load on it, are weighed by the scale.

Figure 3:
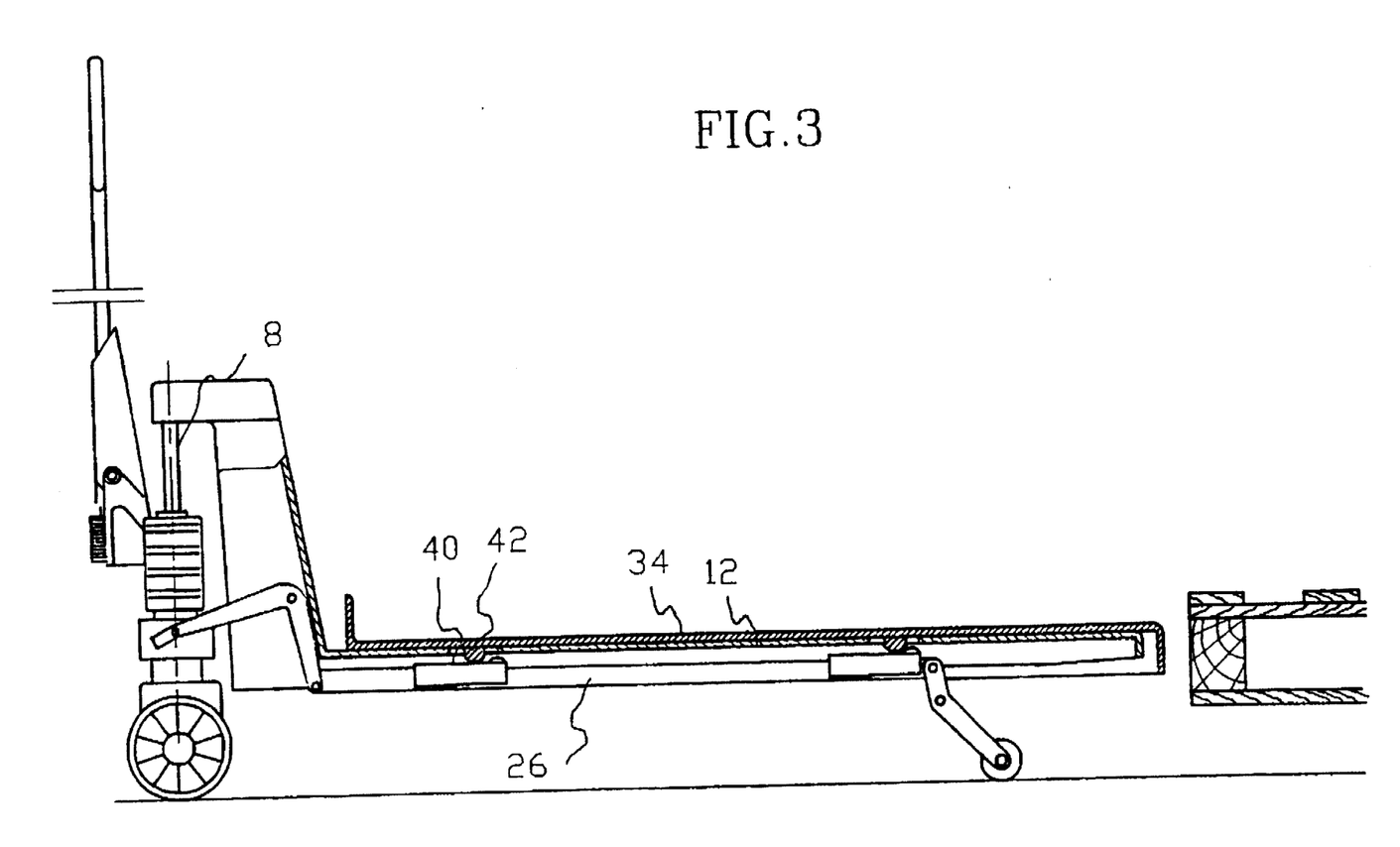

After weighing the load, the piston 8 is further raised as in FIG. 3 so that the carrier enters its transport state. The raising of the piston causes the bar 26 to move further forward so that the protuberance 40 passes the contact point 42 and the scale returns to a neutral position in which the weighing platfrom 34 is supported by the base member 12 and there is no contact between the platform and the load cells. The pallet and load can now be transported to other locations without the danger that the load cell will absorb damaging shocks.

As mentioned above, the protuberance of the load cell is formed so as to reduce the friction between it and the contact point. This function could be served, for example, by a ball bearing or a roller. In addition, the contact point will preferrably have curved or slanted ends to facillitate the relative movement between the two surfaces. The length of the contact point will determine the length of time during which the weighing will take place. The raising of the pallet carrier platform is a continuous process, with a microswitch controlling the transmittal of the weight measurement to a display (not shown) located near the operater. This insures that the number displayed will be an accurate indication of the weight measured when the weighing platform is fully and exclusively supported by the load cells.

Figure 4A:
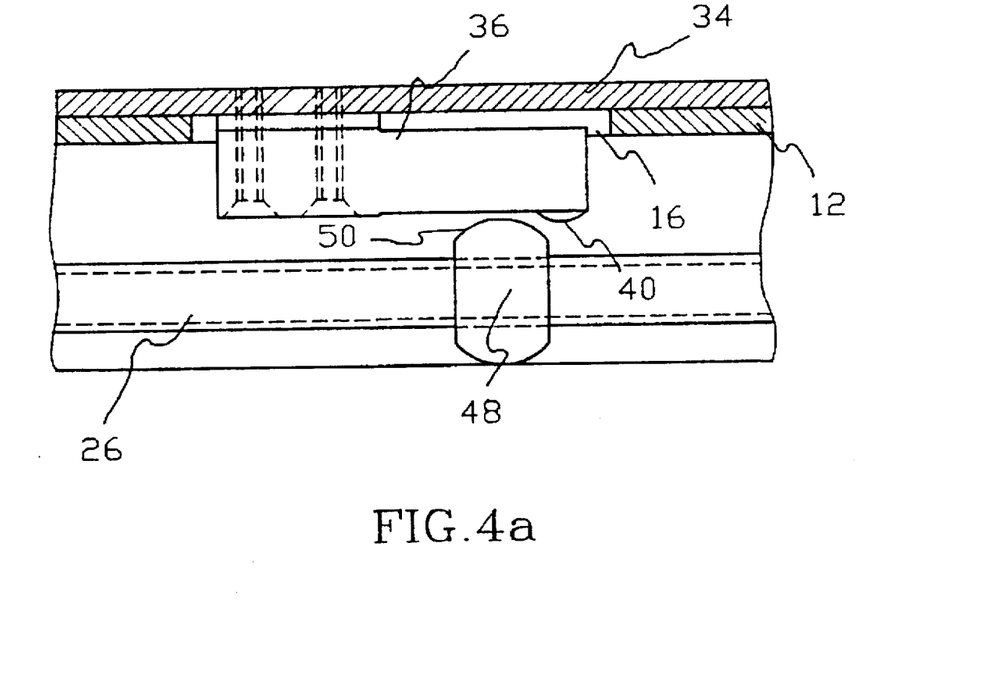
FIGS. 4a and 4b are side, sectional views of a detail of a second preferred embodiment according to the invention.
Figure 4B:
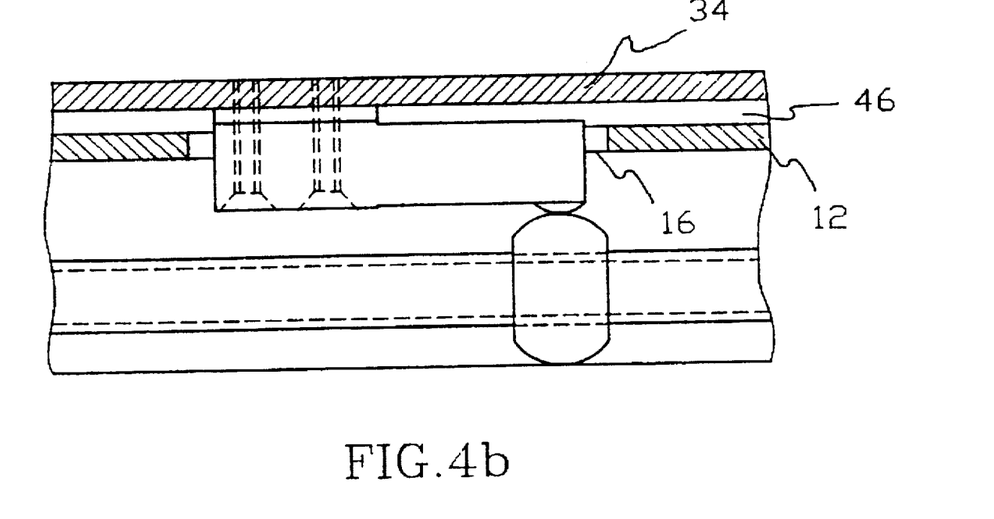

Other configurations of the scale of the invention are also possible. FIGS. 4a and 4b illustrate a portion of a pallet carrier in which the load cell 36 is mounted on the lower surface of the weighing platform 34 and protrudes through an opening 16 in the base member 12. The bar 26 is positioned within the base member 12 and is threaded so as to engage a correspondingly threaded nut 48 which can be rotated so as to move axially along the bar. The circumference 50 of the nut protrudes above and below the bar 26.

In FIG. 4a the platform is supported by the base member and there is no contact between the load cell 36 and the nut 48 on the bar. The scale is thus in the neutral position.

In FIG. 4b, the bar has moved forward, as described above in relation to FIGS. 2 & 3, causing the circumference 50 of the nut to come into contact with the protuberance 40 of the load cell, so that the load cell is supported by the nut. This lifts the weighing platform 34 above the base member 12 so that an interval 46 is formed between them. In this state, the platform is supported by the load cell and the scale is in the operational or weighing position. Further forward movement of the bar will return the scale to the neutral position.

The advantage of this embodiment of the invention is that the nut can be positioned at any location along the bar. In this way, the operater can determine the point during the raising of the pallet carrier at which the scale will be in the operational position. For example, if it is desired that the operational position occur when the carrier is fully raised, the operater will thread the nut backwards so that contact with the load cell is made only when the bar reaches its maximal forward position. This advantage can also be applied to the embodiment of FIGS. 1–3, whereby the contact point and/or load cell can be transfered between several positions.

Figure 5A:
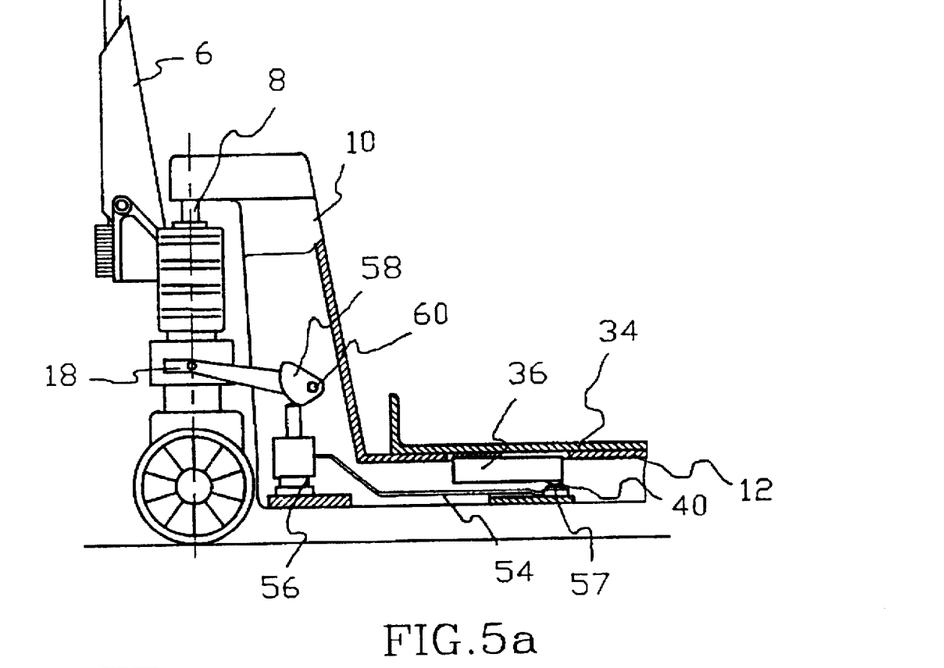
FIGS. 5a and 5b are partial, side sectional views of a third preferred embodiment of the invention.

The embodiments described above involve basically mechanical systems in which the relative movement between the load cell and the contact point is substantially horizontal. However, a vertical translational movement between the load cell and contact point can also be utilized to operate the scale. In FIG. 5a, the load cell 36 is mounted as in FIG. 4a under the weighing platform 34, which is supported by the base member 12. Positioned directly below the protuberance 40 of the load cell in spaced relation is a small hydraulic piston 52 which is fixed to the base member 12. The piston 52 is connected through a conduit 54 to a larger hydraulic piston 56 which is mounted inbetween the sides of the frame 10 and the levers 18. A cam 58 fixedly attached to the middle of the axle 60 is positioned directly above the piston 56. The scale illustrated in FIG. 5a is in the neutral position.

Figure 5B:
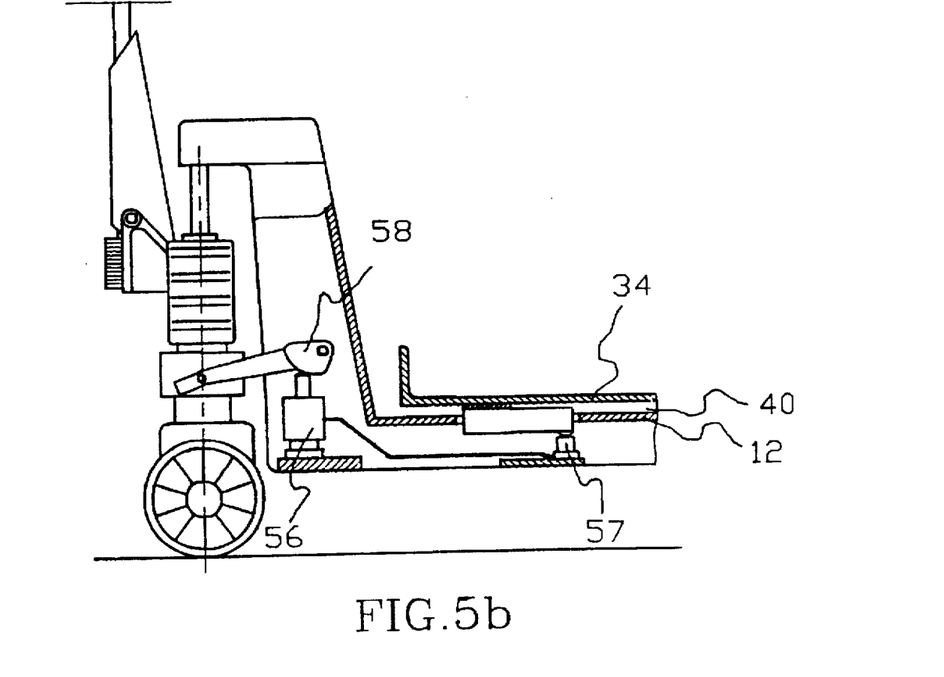

The operation of the scale is illustrated in FIG. 5b. As the piston 8 of the pallet carrier is raised by the lifting handle 6, the lever 18 is rotated as described above and the cam 58 rotates, pressing down on the large piston 56. The pressure is conducted to the small piston 52 through the conduit and the piston 52 rises, pushing up against the protuberance of the load cell. The weighing platform is lifted above the base 12 and an interval 46 is formed. The platform is now supported by the load cell, and the scale is in the operational position. Further rotation of the cam releases the pressure on the pistons 56 and 52 and the scale reverts to the neutral position. The shape of the cam will determine at what point and for how long the scale will be in the operational position. This embodiment thus illustrates a combination mechanical-hydraulic operation of the scale.

Figure 6:
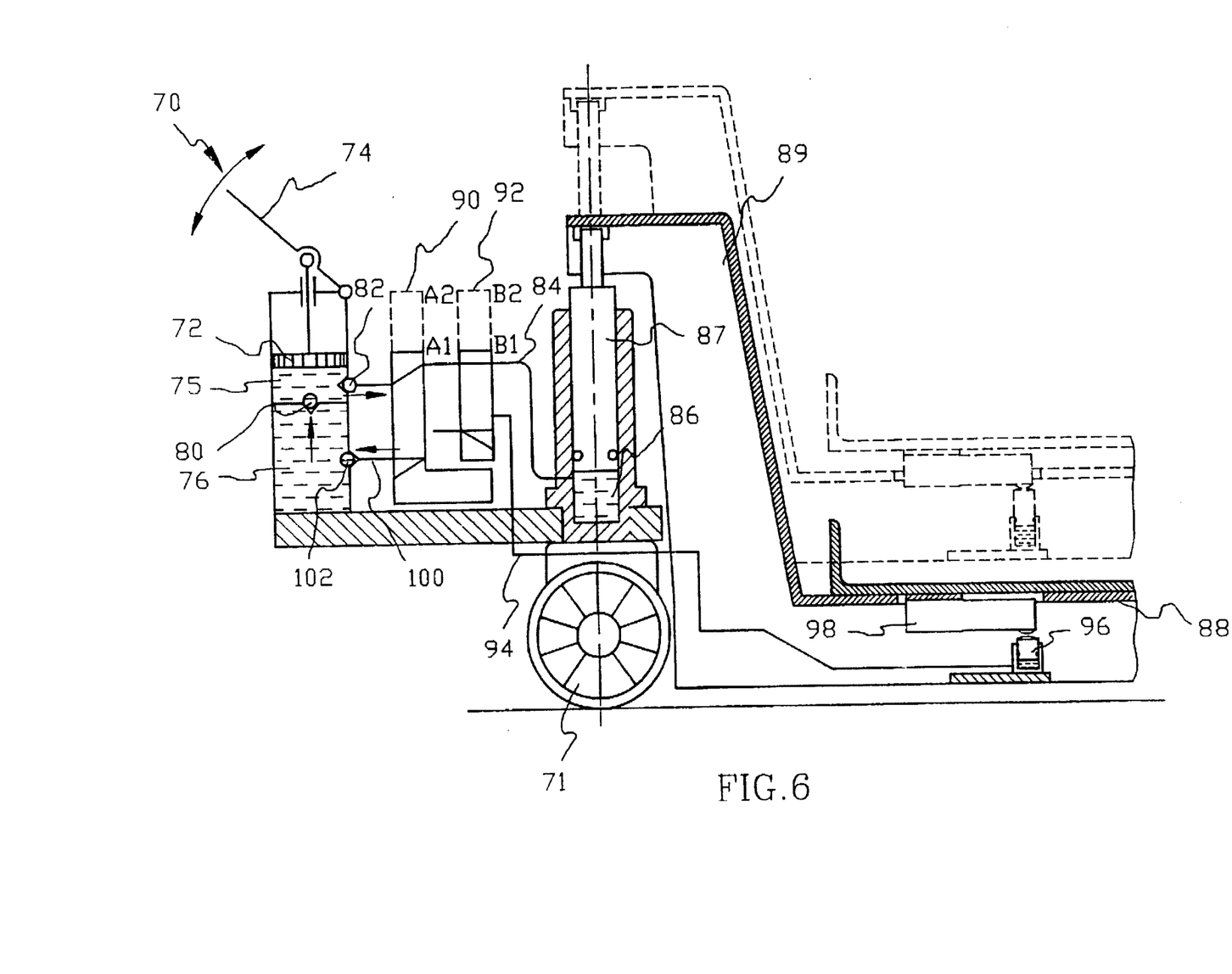
FIG. 6 is a partial, side sectional view of a fourth preferred embodiment of the invention.

Referring now to FIG. 6, there is illustrated a pallet carrier 70 comprising a further embodiment of the invention in which an additional control member has been added so that actuation of the scale is separated from the lifting of the pallet carrier.

To the rear of the carrier and above the steering wheels 71 is a first hydraulic piston 72 which is raised and lowered in a first piston housing 75 by a handle 74. A fluid reserve tank 76 is located below the piston housing and connected to it through a one-way valve 80 which allows the hydraulic fluid to flow from the reserve tank into the piston housing but not in the reverse direction.

On application of pressure by the piston 72 on the fluid in the housing 75, the fluid flows through a second one-way valve 82 via a conduit 84 to a second piston housing 86. Contained in housing 86 is piston 87 which is connected to the base member 88 of the carrier through frame 89, as in FIG. 1 above. The conduit 84 passes through first 90 and second 92 control valves interspaced between the first piston housing 75 and the second piston housing 86. A second conduit 94 leads from the second control valve 92 to a series of pistons positioned under corresponding load cells 98, as was described above with reference to FIG. 5a. A third conduit 100 leads from the first control valve 90 to the reserve tank 76 through a third one-way valve 102. The scale illustrated in FIG. 6 is in the neutral position.

The first control valve 90 controls the lifting of the base member while the second control valve 92 controls the operation of the scale. Each of the control valves can be placed by the operator in a lowered position—A1 and B1, respectively—or a raised position—A2 and B2, respectively. When both of the control valves are lowered (A1, B1) and pressure is applied to the first piston 72, the second piston 87 lifts the base member 88 while the scale remains in the neutral position. On lifting the second control valve 92 (A1, B2), the second conduit 94 is connected to the first piston 72 and the pistons 96 make contact with the load cells 98, so that the scale enters the operational position, as described above with reference to FIG. 5b. On additionally lifting the first contol valve 90 (A2, B2), the fluid flows into the reserve tank through the conduit 100 and the valve 102, thus releasing the pressure. As a result, the carrier reverts to its rest position and the scale to its neutral position. This embodiment operates as a purely hydraulic system.

This system is advantageous in that the scale can enter the operational position during any point in the raising process, simply by lifting contol valve 92 from position B1 to position B2.

Figures 7, 8:
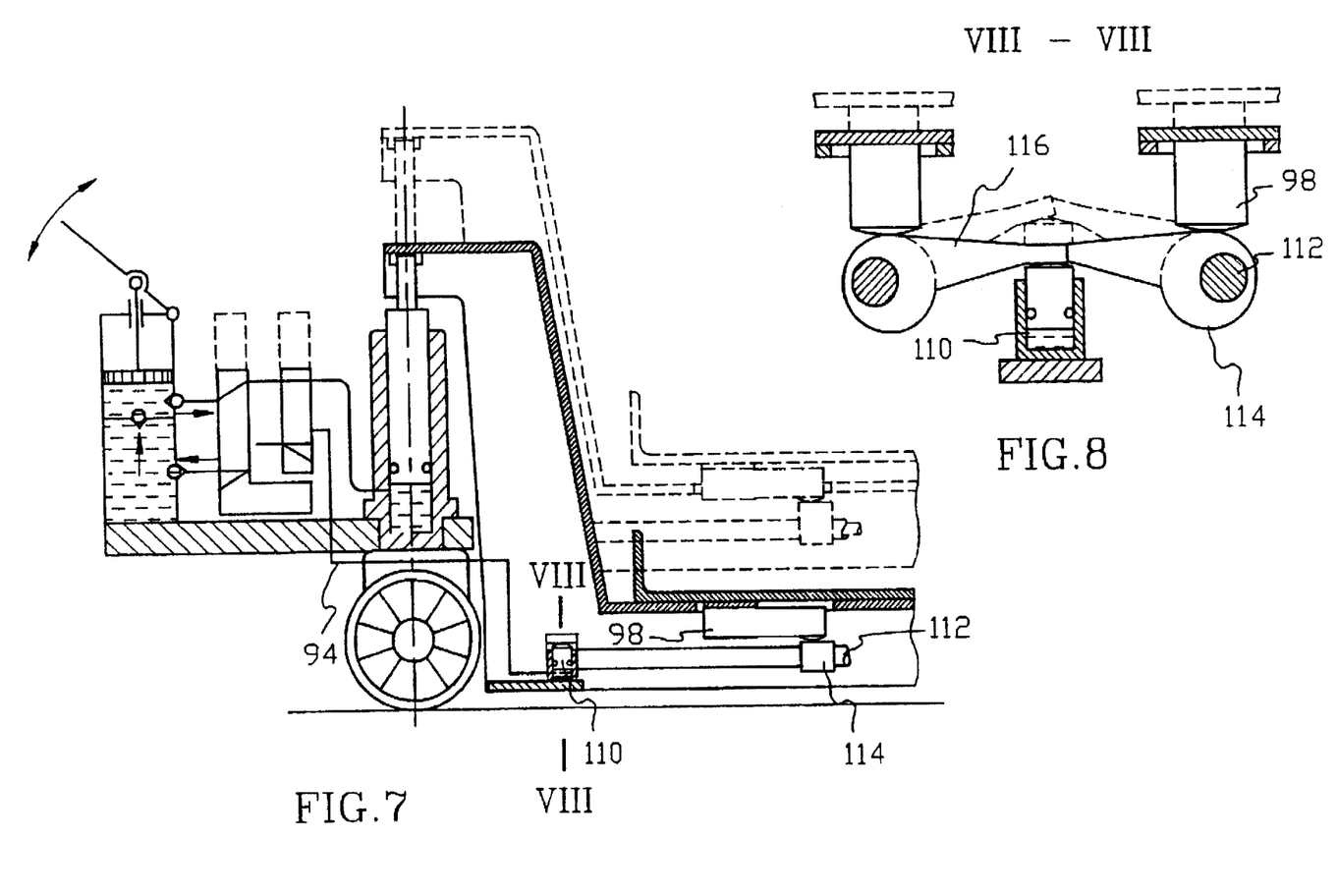
FIG. 7 is a partial, side sectional view of a fifth preferred embodiment of the invention.
FIG. 8 is a transverse cross-sectional view of the lower portion of the embodiment of FIG. 7 along line VIII—VIII.

FIGS. 7 and 8 illustrate a similar pallet carrier which operates as an hydraulic-mechanical system. In this embodiment, only one piston 110, located under the frame 89, is connected to the conduit 94. Extending directly beneath the load cells 98 is the bar 112 enveloped by an eccentric sleeve 114. In the neutral position, there is no contact between the sleeve and the load cells. The sleeve has extensions 116 positioned beneath the frame and above the piston.

The operation of the piston 110 is illustrated in FIG. 8 for a fork-lift carrier. When pressure is applied to the piston, it rotates the sleeves 114 by pushing up the sleeve extensions 116. The sleeves then make contact with the load cells 98 and the scale enters the operational position. Thus, a rotational movement controls the operational position of the scale.

While the present invention has been described in terms of several preferred embodiments related to pallet carriers, it is expected that various modifications and improvements will occur to those skilled in the art upon consideration of this disclosure. In particular, the scale of the invention is not limited to pallet carriers, but can be used also in stationary weighing devices in which the scale can be alternated between a neutral and an operational position. It will also be obvious to those skilled in the art that the weighing function of the scale can be made independent of the lifting function of the pallet carrier.

What is claimed is:

1. A scale for weighing a load comprising:
    a base member;
    a weighing platform for supporting said lead;
    a lead cell located below said weighing platform so as to alternate between an operational position, in which said, weighing platform is supported by said lead cell for measuring the weight of said load, and a neutral position, in which said weighing platform is supported by said base member for carrying said load;
    a contact member located below said weighing platform so as to reversibly come into contact with said load cell;
    wherein said load cell alternates between said operational position and said neutral position due to a relative movement between said load cell and said contact member; and
    a generating means for generating said movement;
    wherein said scale is incorporated in a pallet carrier;
    wherein said pallet carrier comprises a linking bar coupled to said base member for facilitating the lifting of the base member.

2. A scale according to claim 1 wherein said relative movement is due to a movement of said contact point relative to said load cell.

3. A scale according to claim 1 wherein said relative movement is due to a movement of said load cell relative to said contact point.

4. A scale according to claim 1 wherein said movement is translational.

5. A scale according to claim 4 wherein said translational movement is substantially horizonal.

6. A scale according to claim 5 wherein said contact member is a protuberance.

7. A scale according to claim 4 wherein said translational movement is vertical.

8. A scale according to claim 7 wherein said contact member is a piston.

9. A scale according to claim 1 wherein said movement is rotational.

10. A scale according to claim 9 wherein said contact member is a cam element.

11. A scale according to claim 1 wherein said generating means is mechanical.

12. A scale according to claim 1 wherein said generating means is hydraulic.

13. A scale according to claim 11 wherein said generating means is a combination of mechanical and hydraulic.

14. A scale according to claim 1 wherein said scale is operationally linked to the lifting mechanisms of said pallet carrier.

15. A scale according to claim 1 wherein the locations of at least one of said contact member and said cell are adjustable.

16. A scale according to claim 15 wherein said contact member is a nut.

17. A scale according to claim 1 further comprising a control valve to separate between the lifting mechanism of said pallet carrier and the weighing function of the scale.

18. A pallet carrier incorporating the weighing scale of claim 1.

19. A scale for weighing a load comprising:
    a base member;
    a weighing platform for supporting said load;
    a load cell located below said weighing platform so as to alternate between an operational position, in which said, weighing platform is supported by said load cell for measuring the weight of said load, and a neutral position, in which said weighing platform is supported by said base member for carrying said load;
    a contact member located below said weighing platform so as to reversibly come into contact with said load cell;
    wherein said load cell alternates between said operational position and said neutral position due to a relative rotational movement between said load cell and said contact member; and
    a generating means for generating said movement; and wherein said contact member is a cam element.

20. A scale according to claim 19 wherein said relative movement is due to a movement of said contact point relative to said load cell.

21. A scale according to claim 19 wherein said relative movement is due to a movement of said load cell relative to said contact point.

22. A scale according to claim 19 wherein said movement is translational.

23. A scale according to claim 22 wherein said translational movement is substantially horizontal.

24. A scale according to claim 23 wherein said translational movement is substantially vertical.

* * * * *

UNITED STATES PATENT AND TRADEMARK OFFICE
CERTIFICATE OF CORRECTION

PATENT NO.: 5,739,478
DATED: April 14, 1998
INVENTOR(S): Uri ZEFIRA

It is certified that error appear in the above-identified patent and that said Letters Patent is hereby corrected as shown below:

Column 5, lines 62 and 64 - change "lead" to "load".

Signed and Sealed this

Sixteenth Day of June, 1998

*Attest:*

BRUCE LEHMAN

*Attesting Officer*     *Commissioner of Patents and Trademarks*